(12) United States Patent
Phan Huy et al.

(10) Patent No.: US 9,379,797 B2
(45) Date of Patent: Jun. 28, 2016

(54) RADIO COMMUNICATION METHOD AND DEVICE FOR MULTIPLE USER ANTENNAS

(75) Inventors: Dinh Thuy Phan Huy, Paris (FR); Matthieu Crussiere, Laille (FR); Maryline Helard, Rennes (FR); Thierry Dubois, Rennes (FR)

(73) Assignee: Orange, Paris (FR)

( * ) Notice: Subject to any disclaimer, the term of this patent is extended or adjusted under 35 U.S.C. 154(b) by 436 days.

(21) Appl. No.: 13/880,713

(22) PCT Filed: Oct. 20, 2011

(86) PCT No.: PCT/FR2011/052458
§ 371 (c)(1),
(2), (4) Date: Apr. 19, 2013

(87) PCT Pub. No.: WO2012/052692
PCT Pub. Date: Apr. 26, 2012

(65) Prior Publication Data
US 2013/0201958 A1   Aug. 8, 2013

(30) Foreign Application Priority Data
Oct. 22, 2010   (FR) ...................................... 10 58688

(51) Int. Cl.
*H04J 1/00*   (2006.01)
(Continued)

(52) U.S. Cl.
CPC ................ *H04B 7/06* (2013.01); *H04B 7/0413* (2013.01); *H04L 5/0023* (2013.01); *H04L 5/0037* (2013.01); *H04L 25/03343* (2013.01); *H04L 27/2639* (2013.01); *H04L 2025/03426* (2013.01)

(58) Field of Classification Search
None
See application file for complete search history.

(56) References Cited

U.S. PATENT DOCUMENTS

| | | | | |
|---|---|---|---|---|
| 6,304,515 | B1 * | 10/2001 | Spiesberger | 367/124 |
| 2003/0123565 | A1 * | 7/2003 | Fukuda et al. | 375/267 |
| 2010/0085902 | A1 * | 4/2010 | Phan Huy et al. | 370/280 |

FOREIGN PATENT DOCUMENTS

| | | |
|---|---|---|
| GB | 2 463 508 | 3/2010 |
| WO | WO 2007/095102 | 8/2007 |

OTHER PUBLICATIONS

Nguyen et al., "On the Performance of One Bit Time Reversal for Multi-User Wireless Communications," Wireless Communications Systems, 2007, ISWCS 2007, 4th International Symposium on, IEEE, Piscataway, New Jersey.
International Search Report and Written Opinion received in International Patent Application No. PCT/FR2011/052458, filed on Oct. 20, 2011, mailed on Jan. 4, 2012.

(Continued)

*Primary Examiner* — Kevin C Harper
(74) *Attorney, Agent, or Firm* — Knobbe, Martens, Olson & Bear LLP

(57) ABSTRACT

The invention relates to a multiantenna radio communications method wherein frequency subbands $B_{s_k}$, for k=1, ..., P, are allocated respectively to P user antennas $s_1, ..., s_P$ belonging to one or more users, from within a total frequency bandwidth $B_T$, and wherein at least one of the user antennas communicates with the base station over its respective frequency subband $B_{s_k}$ by means of a signal that has been filtered by time reversal. According to the invention, for at least one pair of user antennas $S_i$ and $S_j$, where and i,j=1, ..., P and i≠j, the respective frequency subbands $B_{s_i}$ and $B_{s_j}$ overlap by $\delta B_{s_i,s_j}$, said overlap $\delta B_{s_i,s_j}$ being a predetermined function of the correlation between the respective propagation channels of these two user antennas with said base station.

7 Claims, 2 Drawing Sheets

(51) Int. Cl.
*H04B 7/06* (2006.01)
*H04B 7/04* (2006.01)
*H04L 5/00* (2006.01)
*H04L 25/03* (2006.01)
*H04L 27/26* (2006.01)

(56) References Cited

OTHER PUBLICATIONS

Paquelet, et al., "An Energy Adaptive Demodulation for High Data Rates with Impulse Radio", P2.15, 4 pages, Sep. 2004.

\* cited by examiner

RADIO COMMUNICATION METHOD AND DEVICE FOR MULTIPLE USER ANTENNAS

This application is a national stage application under 35 U.S.C. §371, claiming priority to International Application No. PCT/FR2011/052458, having an international filing date of Oct. 20, 2011, and published as International Publication No. WO 2012/052692 A1, which claims priority to French Patent Application No. 1058688, filed on Oct. 22, 2010, each of which is incorporated by reference herein in its entirety and for all purposes.

BACKGROUND

1. Field of the Invention

The invention relates to wireless digital communications systems. More precisely, it relates to a transmit/receive technique in the context of communications using a plurality of user antennas, which antennas may belong to a single user or to a plurality of users, each user having a number of antennas that is greater than or equal to 1.

2. Description of the Related Art

In general, implementing communications of the multipoint and multi-antenna type raises the problem of sharing access to the spectrum resource, i.e. sharing the propagation channel. The challenge to be met by a multiple access technique is to enable different messages or data to be transmitted in parallel to distinct receivers while sharing a common physical resource, and while minimizing the resulting interference.

Various access techniques are presently in use in radio systems. Particular mention may be made of techniques that make use of orthogonality (in time, in frequency, or in space) in order to transmit information in parallel: time division multiple access (TDMA); frequency division multiple access (FDMA), such as orthogonal frequency division multiple access (OFDMA); code division multiple access (CDMA); or space division multiple access (SDMA).

By way of example, in the context of FDMA, there is a so-called "multiband IR-UWB" technique (cf. the article by S. Paquelet and L. M. Aubert entitled "An energy adaptive demodulation for high data rates with impulse radio", Proceedings of IEEE Radio and Wireless Conference, pp. 323 to 326, September 2004). That is a multiband transmission technique making use of an impulse waveform; the message to be transmitted is constituted by on-off keying (OOK) pulses that are frequency multiplexed over a plurality of adjacent and disjoint frequency subbands. Impulse radio ultra-wideband (IR-UWB) signals are thus put into parallel on the frequency axis.

The TDMA, FDMA, and CDMA techniques, or indeed the "mixed" (time-frequency-code) multiple access techniques that rely on them, represent responses to the multiple access problem that are simple, but that rapidly reach their limits when the number of users increases. For example, with FDMA, it is possible to allocate a given frequency subband to only one user antenna, thereby severely limiting the spectrum efficiency of that technique.

SDMA provides a solution to the problem of the number of users, but that technique presents its own drawbacks. SDMA makes use of matrix operations, which are generally complex, that are applied to the multiple-in multiple-out (MIMO) channel between a transmit antenna array and a receive antenna array (the MIMO channel matrix has as its coefficient at the $i^{th}$ line and the $j^{th}$ column the gain of the propagation channel between the $j^{th}$ transmit antenna and the $i^{th}$ receive antenna). In addition, as is well known to the person skilled in the art, SDMA can achieve an improvement in quality over CDMA, FDMA, or TDMA only when the propagation channel lends itself to such an improvement, and when the propagation channel does not so lend itself, it can even present performance that is not as good as that of CDMA, FDMA, or TDMA. Two conditions that are necessary (but not sufficient) for SDMA to achieve a quality improvement over CDAM, FDMA, and TDMA are firstly that the signal to noise ratios at the receive antennas are high, and secondly that the rank of the matrix of the MIMO channel is greater than or equal to the number of multiplexed streams; consequently, if the number of streams to be multiplexed is equal to the number of receive antennas, it is necessary to have a number of transmit antennas that is greater than or equal to the number of receive antennas.

The application to digital communications of so-called "time reversal" techniques has made it possible to improve the management of multiple access. Time reversal is a technique for focusing waves (used originally in the field of soundwaves) that relies on the invariance of the wave equation under time reversal. Thus, a time-reversed wave propagates like a forward wave going backwards in time. When a short pulse transmitted from an origin point propagates in a propagation medium, and when a portion of that wave as received by a destination point is time-reversed before being sent back into the propagation medium, the wave converges on the origin point where it reforms as a short pulse. The signal picked up at the origin point is practically identical in its waveform to the original signal transmitted from the origin point.

The time reversal technique is applied to radio communications networks in order to cancel the effect of the propagation channel on the signal received by the receive antenna, in particular by reducing the spreading of the channel by concentrating its energy on a focal point at which the receive antenna is located, and in order to simplify the processing of the symbols that are received after they have been conveyed by the channel. To do this, the antenna signal transmitted by the transmit antenna is pre-equalized by applying coefficients obtained from the time reversal of the impulse response of the propagation channel that is to convey the antenna signal. Performing time reversal thus requires the transmit antenna to have knowledge about the propagation channel in the frequency band dedicated to the signals coming from that antenna.

The application of time reversal techniques to managing multiple access makes use of the fact that the propagation channel between the transmit antenna and a receive antenna possesses a unique electromagnetic signature that can be used for the purposes of separating messages addressed to different receive antennas.

Thus, one approach that makes use of time reversal is proposed in patent application GB 2 463 508 in the context of transmission in blocks, such as OFDMA. That patent application discloses a multiantenna radio communications method in which each respective user antenna communicates with a base station on a frequency subband that has been respectively allocated thereto by means of a signal that has been filtered by time reversal. That multiple-access technique can be considered as being a compromise between frequency division access and pure time reversal access. Its multiband aspect makes it possible to manage signal separation that time reversal on its own cannot manage correctly.

That technique reduces the complexity of receivers compared with multiband methods that do not use time reversal filtering, such as conventional FDMA or the above-described "multiband IR-UWB" technique: in this situation, the signal is by definition pre-equalized and time-focused so that on reception, demodulation is simpler and in particular channel equalization is simpler (as seen by the receiver, the channel is quasi-Gaussian). That technique also reduces the complexity of transmitters relative to known pre-equalization methods that do not make use of time reversal.

Nevertheless, that technique of patent application GB 2 463 508 presents the same drawback as other FDMA type techniques, namely poor spectrum efficiency.

BRIEF SUMMARY OF THE INVENTION

The present invention thus relates to a multiantenna radio communications method wherein frequency subbands $B_{s_k}$, for $k=1, \ldots, P$, are allocated respectively to P user antennas $s_1, \ldots, s_P$ belonging to one or more users, from within a total frequency bandwidth $B_T$, and wherein at least one of the user antennas communicates with the base station over its respective frequency subband $B_{s_k}$ by means of a signal that has been filtered by time reversal. Said method is remarkable in that for at least one pair of user antennas $s_i$ and $s_j$, where $i,j=1, \ldots, P$ and $i \neq j$, the respective frequency subbands $B_{s_i}$ and $B_{s_j}$ overlap by $\delta B_{s_i,s_j}$, said overlap $\delta B_{s_i,s_j}$ being a predetermined function of the correlation between the respective propagation channels of these two user antennas with said base station.

It should be observed that in the context of the present invention, the term "base station" designates any central transmit and/or receive point in communication with a plurality of antennas that are referred to as "user" antennas.

This serves to organize signal sharing over the total bandwidth of the system, by allowing subbands to be reused in full or in part as a function of the correlation between the channels allocated respectively to each user antenna. Thus, unlike FDMA approaches that avoid any overlap between the various subbands, in this invention signals are not necessarily separated in frequency but may be shared with a certain amount of spectral overlap. More precisely, two user antennas having channels that are highly cross-correlated preferably make use of subbands that are disjoint, whereas two user antennas having channels that are sufficiently decorrelated can make use of the same subbands. In intermediate manner, partial overlaps may be provided as a function of residual interference levels, as explained in detail below. Time reversal serves advantageously to separate the signals transmitted in the same frequency band or in frequency bands that overlap in part.

By means of these provisions, spectrum efficiency is advantageously improved. In addition, the present invention has the advantage of achieving a quality improvement—or at least of avoiding any loss of quality—compared with CDMA, FDMA, or TDMA, and regardless of the propagation channels, i.e. even when signal to noise ratios are not very high, and even when the matrix of the MIMO channel has a rank that is less than 2: according to the invention partial overlap of frequency bands is controlled as a function of the correlation between the propagation channel. Furthermore, the constraint of the SDMA approach whereby the number of transmit antennas needs to be increased with increasing number of receive antennas is advantageously eliminated.

It should also be observed that the invention does not require any orthogonality.

According to particular characteristics, said correlation between the propagation channels of two user antennas $s_i$ and $s_j$ is evaluated from auto-correlation and cross-correlation functions between the impulse responses $h_i(t)$ and $h_j(t)$ of said two channels.

By means of these provisions and as described in detail below, it is possible conveniently to construct a metric for evaluating the effect of the channel of one user antenna on the channel of another user antenna, and consequently to evaluate the correlation between these two channels.

According to other particular characteristics, in order to include an additional user antenna, said method comprises the following steps:

for each pair of user antennas $s_i$ and $s_j$, where and $i,j=1, \ldots, P$ and $i \neq j$, calculating a target overlap $\delta B_{s_i,s_j}$;

redistributing P frequency subbands to the P user channels, now referenced $\omega_1, \ldots, \omega_P$, in such a manner that the subbands of each pair of successive subbands $B_{\omega_l}$ and $B_{\omega_{l+1}}$ overlap by $\delta B_{s_i,s_j}$, where the antenna $\omega_l$ was previously referenced $s_i$ and the antenna $\omega_{l+1}$ was previously referenced $s_j$;

allocating to the new user antenna, referenced $\omega_{P+1}$, a frequency subband $B_{\omega_{P+1}}$ from the bandwidth $B_T$, which subband is of width equal to at least a portion of the sum of the overlaps $\delta B_{s_i,s_j}$; and signaling to each of the (P+1) user antennas of the new frequency subband $B_{\omega_k}$, where $k=1, \ldots, P+1$, that has been respectively allocated thereto.

By means of these provisions, and contrary to the conventional SDMA approach, optimizing the use of the spectral resource does not require complex matrix operations.

In corresponding manner, the invention also relates to a multiantenna radio communications device possessing means for communicating with P user antennas $s_1, \ldots, s_P$ belonging to one or more users and having frequency subbands $B_{s_k}$, where $k=1, \ldots, P$, respectively allocated thereto from within a total frequency bandwidth $B_T$, and possessing means for communicating with at least one of the user antennas over its respective frequency subband $B_{s_k}$ by means of a signal that has been filtered by time reversal. Said device is remarkable in that it possesses means for allocating respective frequency subbands $B_{s_i}$ and $B_{s_j}$ to at least one pair of user antennas $s_i$ and $s_j$, where and $i,j=1, \ldots, P$ and $i \neq j$, the respective frequency subbands $B_{s_i}$ and $B_{s_j}$ overlapping by $\delta B_{s_i,s_j}$, and said overlap $\delta B_{s_i,s_j}$ being a predetermined function of the correlation between the respective propagation channels of said two user antennas with said device.

According to particular characteristics, said device possesses means for evaluating said correlation between the propagation channels of the two user antennas $s_i$ and $s_j$ from auto-correlation and cross-correlation functions between the impulse responses $h_i(t)$ and $h_j(t)$ of said two channels.

The advantages provided by these devices are essentially the same as those provided by the corresponding methods summarized above.

The invention also provides a base station including any one of the devices summarized above.

It should be observed that it is possible to provide the devices that are summarized briefly above in the context of software instructions and/or in the context of electronic circuits.

The invention also provides a computer program downloadable from a communications network and/or stored on a computer readable medium and/or executable by a microprocessor. The computer program is remarkable in that it includes instructions for executing the steps of a multiantenna radio communications method as summarized above, and when executed on a computer.

The advantages provided by the computer program are essentially the same as those provided by said methods.

BRIEF DESCRIPTION OF THE DRAWINGS

Other aspects and advantages of the invention appear on reading the following detailed description of particular implementations given as non-limiting examples. The description refers to the accompanying drawings, in which.

DETAILED DESCRIPTION

The invention lies in the field of communications between a base station and a plurality of user antennas by means of a signal that combines multiband transmission with time reversal filtering.

This approach must therefore not be confused with a single band approach that uses time reversal filtering, such as the approach applied to ultra-wideband (UWB) communications in the context of SDMA (cf. the article by H. T. Nguyen entitled "On the performance of one bit time reversal for multiuser wireless communications", IEEE ISWCS, pp. 672 to 676, Trondheim, Norway 2007): in that technique, known as "SDMA UWB", each transmitted signal occupies the entire bandwidth used by the system (more precisely, each transmitted signal has an impulse type waveform that occupies a frequency bandwidth of several hundreds of megahertz (MHz)). That SDMA UWB technique presents the advantage of being simpler to perform than conventional SDMA techniques in terms of matrix operations. Nevertheless, it presents the same drawback as other SDMA techniques: it achieves an improvement in quality over CDMA, FDMA, or TDMA only when the propagation channel lends itself to that improvement, and when the propagation does not so lend itself, it can even give rise to a loss of quality; as mentioned above, the present invention has the advantage of achieving an improvement in quality—or at least of avoiding any loss of quality—in comparison with CDMA, FDMA, or TDMA, regardless of the propagation channel. Furthermore, the present invention reduces the complexity of receivers compared with SDMA UWB, and this continues to apply even when there is only one user: this results from the (preferably) relative narrowness of the bandwidth in which the received signal is sampled in comparison with the total transmission bandwidth ($B_T$) that (preferably) needs to be wide in order to enable good focusing (where time focusing is of increasing effectiveness with increasing width of the bandwidth $B_T$ used for performing time reversal).

As a particular implementation, consideration is given below to a communications system that uses a base station E having a transmit antenna and receive points $R_k$ (user terminals) each of which has a respective receive antenna, where k=1, . . . , K, the receive points being distributed in the spatial environment of the transmit point. To simplify notation, the term "antenna k" is used to designate the antenna of receive point $R_k$. The base station selects users and allocates to each of them a subband taken from the total frequency bandwidth $B_T$ of the system.

The various impulse responses of the channels connecting the antenna of point E to each of the antennas k are assumed to be known to the base station, following a conventional channel-training stage.

Figure 1:
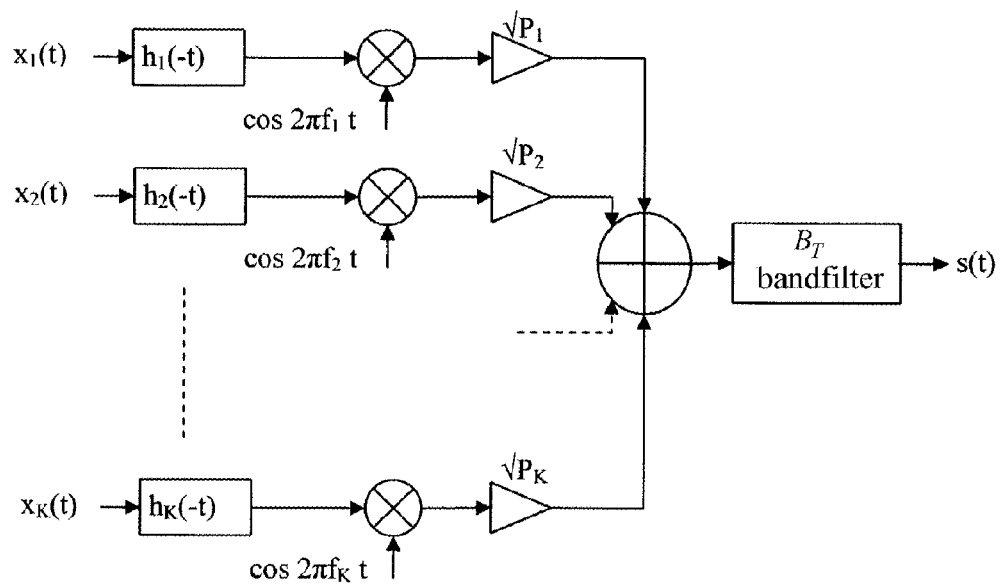
FIG. 1 is a diagram showing the structure of a transmit signal for transmission to a plurality of receive antennas, in an implementation of the invention.

On the basis of this knowledge, and as shown diagrammatically in FIG. 1, the transmitter forms a transmit signal made up of various different messages, in which $x_k(t)$ is the message for antenna k, $h_k(t)$ is the impulse response of the channel between the base station and the antenna k, and $f_k$ is the carrier frequency used for transmitting the signal $x_k(t)$ to the receiver k. The transmitted signal thus has the form:

$$s(t) = \sum_{k=1}^{K} \sqrt{P_k} \, (x_k(t) \otimes h_k(-t)) \cdot \cos(2\pi f_k t)$$

where $P_k$ is the power used for transmitting to the antenna k, and the symbol "$\otimes$" designates the convolution product. The notation $h_k(-t)$ (in opposition to $h_k(t)$) designates the application of a time reversal filter, e.g. as described in the above-mentioned article by H. T. Nguyen; the time reversal filter is applied over a bandwidth that is wider than the bandwidth of each individual message. Finally, the signal is subjected to bandpass filtering over the total bandwidth $B_T$ of the system, this bandwidth preferably being much greater than the minimum bandwidth needed for transmitting each message $x_k(t)$.

Figure 2:
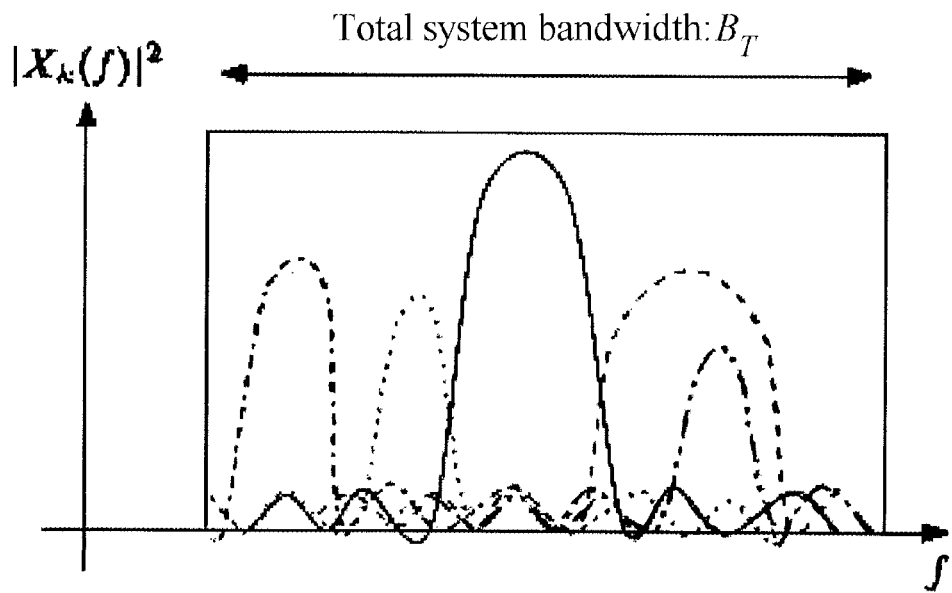
FIG. 2 shows the appearance of the spectrum associated with the signal shown in FIG. 1.

An example of the appearance of the spectrum of the resulting signal is shown in FIG. 2 for signals $x_k(t)$ having symbol durations $T_s$ that might be different from one to another but that are always such that $1/T_s < B_T$. In this figure, the notation $X_k(f)$ represents the Fourier transform of $x_k(t)$.

At the receive point $R_k$, receiver number k filters the signal that is being sent thereto around a subband that is associated therewith. Reducing residual interference that results from other signals or fragments of signals present in the same band is managed by the spatial focusing that results from the time reversal.

The person skilled in the art can easily generalize to a system comprising a base station having a plurality of transmit antennas and/or to users each having one or more receive antennas.

Below there follows a description of the steps in an implementation of the method of the invention for distributing frequency subbands.

Step 0: Initial Resource Allocation

It is assumed that the base station has allocated (optionally disjoint) subbands to antennas of the system, and that these subbands together cover the entire available bandwidth $B_T$. Let P be the number of selected antennas and $S = \{s_1 \ldots s_p\}$ the set of these antennas.

It is assumed that the base station knows the MIMO propagation channel. It is assumed that by knowing the MIMO channel, the base station is capable of predicting the data rate that can be achieved by each receive antenna assuming that time reversal is applied to focus a data stream on the antenna in question. It is assumed that it can perform this prediction as a function of the frequency band, the power, the modulation, and the coding that are allocated to the antenna in question.

Furthermore, it is assumed that the base station knows the target data rate for each antenna $s_k$, and that consequently it is capable of using known algorithms for power control and for link adaptation and for scheduling (e.g. "proportional share scheduling") in order to determine the power, for which spectrum density is written $\rho_k$, and the frequency band, written $B_{s_k}$, that are required for achieving this target data rate with the assumption of time reversal.

It is assumed that after this initial step, the following two conditions are satisfied:

some of the user antennas have still not been selected (in other words, it is necessary to go from K=P to K=P+1); and the maximum transmission power of the base station has still not been reached.

An attempt is made immediately to release frequency bandwidth for an additional antenna so as to increase the total data rate of the system, but without that degrading the data rate of the antennas that have already been selected. For this purpose, overlap is introduced between bands that have already been allocated in order to reduce the occupation of the frequency bandwidth of the system. This overlap is calculated so that interference between already-selected antennas remains low enough to preserve the data rate of those antennas.

Step 1: Channel Estimation and Time Reversal

In the present implementation, calculating the shares of the antennas over the total bandwidth of the system makes use of auto-correlation and cross-correlation functions between the impulse responses $h_k(t)$ of the various channels. More precisely, it is possible to evaluate the effect of the channel of antenna $s_j$ on the channel of the antenna $s_i$ conveniently by means of the following metric:

$$\Gamma_{ij} = \frac{\sum_{n=1}^{N} |h_i(nT_e)|^2}{\sum_{n=1}^{N} h_i(nT_e) h_j(nT_e)}$$

where i and j designate the indices of the two antennas, $T_e$ is the sampling period (equal to $1/B_T$), and n is the index of the sample among the N successive samples required for describing the impulse response $h_k(t)$ of channel number k. The greater the extent to which the channels i and j possess impulse responses that are decorrelated, the greater the strength of this metric. Thus, a simple implementation of frequency sharing consists in applying overlap between the frequency subbands of the antennas $s_i$ and $s_j$ that is a function of the values of the metric as associated with the correlation of the channel of the antenna $s_j$ with the channel of the antenna $s_i$, and with the correlation of the channel of the antenna $s_i$ with the channel of the antenna $s_j$.

The following quantities are defined:

$\gamma_i(t) = h_i(-t) \otimes h_i(t);$ $\gamma_{ij}(t) = h_j(-t) \otimes h_i(t);$ $\Gamma_{s_i} = E[|\gamma_i(t)|^2];$ and $\Gamma_{s_i s_j} = E[|\gamma_{ij}(t)|^2];$ where the notation "E[. . . ]" designates the time average (average over the duration of the impulse response of the channel). Thus: $\Gamma_{ij} = \Gamma_{s_i}/\Gamma_{s_i s_j}$.

The quantities $\Gamma_{s_i}$ and $\Gamma_{s_i s_j}$ are estimated by the base station during a training stage. For example, $h_i(t)$ and $h_j(t)$ are estimated from pilot signals sent by the antennas i and j and received by the base station, and then $\Gamma_{s_i}$ and $\Gamma_{s_i s_j}$ are calculated from $h_i(t)$ and $h_j(t)$.

Step 2: Calculating Overlaps

This step 2 is performed each time it is needed when implementing step 3 as described below.

A maximum tolerable amount of overlap by the antenna $s_i$ with the antenna $s_j$ is defined as follows:

$\delta B_{s_j \rightarrow s_i} = \alpha_{ij}$ if $\alpha_{ij} > \delta B_{min}$; and $\delta B_{s_j \rightarrow s_i} = 0$ if $\alpha_{ij} \leq \delta B_{min}$;

where $\delta B_{min}$ is a minimum overlap (due to the frequency granularity of the resource allocation), and $\alpha_{ij}$ is a quantity that is referred to herein as the "interference factor" and that is calculated as explained below.

Finally, the overlap between the channels of the antennas $s_i$ and $s_j$ is defined as follows:

$$\delta B_{s_i, s_j} = \min(\delta B_{s_j \rightarrow s_i}, \delta B_{s_i \rightarrow s_j})$$

This overlap can be tolerated both by $s_i$ and by $s_j$.

There follows an explanation of how to calculate the interference factor $\alpha_{ij}$ in several variants.

Variant 1

A predetermined proportionality coefficient θ is defined for limiting interference between two antennas. The interference factor $\alpha_{ij}$ associated with the antennas i and j is calculated as follows:

$$\alpha_{ij} = B_{s_i} \frac{\Gamma_{s_i}}{\Gamma_{s_i s_j}} \theta$$

In this variant 1, the new spectral power density that is allocated respectively to each of the antennas in step 3 as described below is preferably equal to the preceding density.

Variant 2

A minimum threshold $nir_{min}$ is defined for the ratio of noise over interference that can be tolerated without the introduction of overlap degrading the data rate of the antenna $s_i$. By way of example it is possible to use: $nir_{min} = 100$.

The associated interference factor $\alpha_{ij}$ is calculated as follows:

$$\alpha_{ij} = B_{s_i} \frac{N_0}{\rho_{s_j} \Gamma_{s_i s_j} nir_{min}}$$

In this variant 2, the new spectral power density that is allocated respectively to each antenna during step 3 as described below is preferably equal to the preceding density.

Variant 3

This variant, and also variants 4 and 5 below, reference is made to the signal over interference-and-noise ratio (SINR) produced by the antenna $s_j$ on the antenna $s_i$ when the bands $B_{s_i}$ and $B_{s_j}$ overlap by δB, with this being written:

$sinr_{s_j \rightarrow s_i}(\delta B).$

Given the fact that the signals from the antennas $s_j$ and $s_i$ are transmitted with time reversal, this SINR is expressed as follows:

$$sinr_{s_j \rightarrow s_i}(\delta B) = \frac{\rho_{s_i} \Gamma_{s_i}}{N_0 + \rho_{s_j} \Gamma_{s_i s_j} \frac{\delta B}{B_{s_i}}}$$

where $N_0$ designates the spectral density of the noise.

In this variant 3, the interference factor $\alpha_{ij}$ is calculated as a function of a low predetermined ratio X for the data rates of the antennas. More precisely, $\alpha_{ij}$ is defined as being the maximum value of δB that satisfies the following inequality:

$$1 - \frac{B_{s_i} \log\left(1 + \frac{\rho_{s_i} \Gamma_{s_i}}{N_0 + \rho_{s_j} \Gamma_{s_i s_j} \frac{\delta B}{B_{s_i}}}\right)}{B_{s_i} \log\left(1 + \frac{\rho_{s_i} \Gamma_{s_i}}{N_0}\right)} < X$$

Thus, $\alpha_{ij}$ is given by:

$$\alpha_{ij} = B_{s_i} \frac{\frac{\rho_{s_i} \Gamma_{s_i}}{\left(1 + \frac{\rho_{s_i} \Gamma_{s_i}}{N_0}\right)^{1-X} - 1} - N_0}{\rho_{s_j} \Gamma_{s_i s_j}}$$

In this variant 3, the new spectral power density that is allocated respectively to each antenna in step 3 as described below is preferably equal to the preceding density.

Variant 4

The interference factor $\alpha_{ij}$ is calculated so as to limit degradation of the SINRs of already-selected antennas to a predetermined ratio X of their initial SINRs.

The base station calculates $\alpha_{ij}$ as being the maximum value of $\delta B$ that satisfies the following inequality:

$$1 - \frac{\frac{\rho_{s_i} \Gamma_{s_i}}{N_0 + \rho_{s_j} \Gamma_{s_i s_j} \frac{\delta B}{B_{s_i}}}}{\frac{\rho_{s_i} \Gamma_{s_i}}{N_0}} < X$$

Thus, $\alpha_{ij}$ is given by:

$$\alpha_{ij} = B_{s_i} \frac{N_0}{\rho_{s_j} \Gamma_{s_i s_j}} \frac{X}{1 - X}$$

In this variant 4, the new spectral power density that is allocated respectively to each antenna during step 3 as described below is preferably equal to the preceding density.

Variant 5

When noise is negligible compared with interference, SINR is written as follows:

$$sinr_{s_j \to s_i}(\delta B) = \frac{\rho_{s_i} \Gamma_{s_i}}{N_0 + \rho_{s_j} \Gamma_{s_i s_j} \frac{\delta B}{B_{s_i}}} \approx \frac{\rho_{s_i} \Gamma_{s_i}}{\rho_{s_j} \Gamma_{s_i s_j} \frac{\delta B}{B_{s_i}}}$$

The interference factor $\alpha_{ij}$ is calculated so as to constrain the signal over interference ratio of the already-selected antennas $s_i$ to exceed a predetermined threshold $y_{s_i}$.

The base station calculates $\alpha_{ij}$ as being the maximum value of $\delta B$ that satisfies the following inequality:

$$\frac{\rho_{s_i} \Gamma_{s_i}}{\rho_{s_j} \Gamma_{s_i s_j} \frac{\delta B}{B_{s_i}}} > y_{s_i}$$

Thus, $\alpha_{ij}$ is given by:

$$\alpha_{ij} = B_{s_i} \frac{\rho_{s_i}}{\rho_{s_j}} \frac{\Gamma_{s_i}}{\Gamma_{s_i s_j}} \frac{1}{y_{s_i}}$$

When performing this variant 5, in order to guarantee that noise is indeed negligible, the new spectral power density that is allocated respectively to each antenna during step 3 as described below is preferably increased compared with the preceding density (e.g. by multiplying the old spectral power density by a predetermined constant factor that is strictly greater than 1).

Naturally, other variants for calculating the interference factor $\alpha_{ij}$ are possible.

Step 3: Redistribution of Subbands and of Powers

During this step 3, an ordered sequence $\Omega$ is constructed with the elements of S, i.e. the antennas are classified by frequency: for v=1, . . . , P, antenna $\omega_v$ is allocated a frequency band $B_{107\ v}$ lying in the range $f_{v,min}$ and $f_{v,max}$.

This reclassification is arranged in such a manner that the subbands of each pair of successive subbands $B_{\omega_l}$ and $B_{\omega_{l+1}}$ overlap by $\delta B_{s_i,s_j}$, where the antenna $\omega_l$ was previously referenced $s_i$ and the antenna $\omega_{l+1}$ was previously referenced $s_j$.

In particular, when the overlaps are calculated as in above step 2, interference is increased in controlled manner between the streams as a function of the propagation channel. This serves to improve the overall data rate of the system while conserving (or degrading in controlled manner) the data rates of the antennas that have already been selected.

Furthermore, a spectral power density $\phi_v$ is reallocated to each antenna, with the list of these spectral densities constituting a set $\phi$.

It should be observed that before moving onto step 4, it is possible to reiterate above steps 0, 1, 2, and 3, taking as the starting allocation in each new step 0, the allocation as calculated in the preceding iteration in step 3. This iterative process should be stopped when the result of step 2 does not release any bandwidth or when the maximum number of antennas in question has been reached. It should be observed that the improvement achieved by these reiterations is particularly perceptible when the frequency subbands allocated in the initial step 0 (i.e. before any reiteration) do not overlap.

By way of example, an algorithm for performing this redistribution of subbands and of powers is given in Appendix 1 which is applicable to the variants in which the spectral power density allocated to each antenna remains unchanged.

Figure 3:
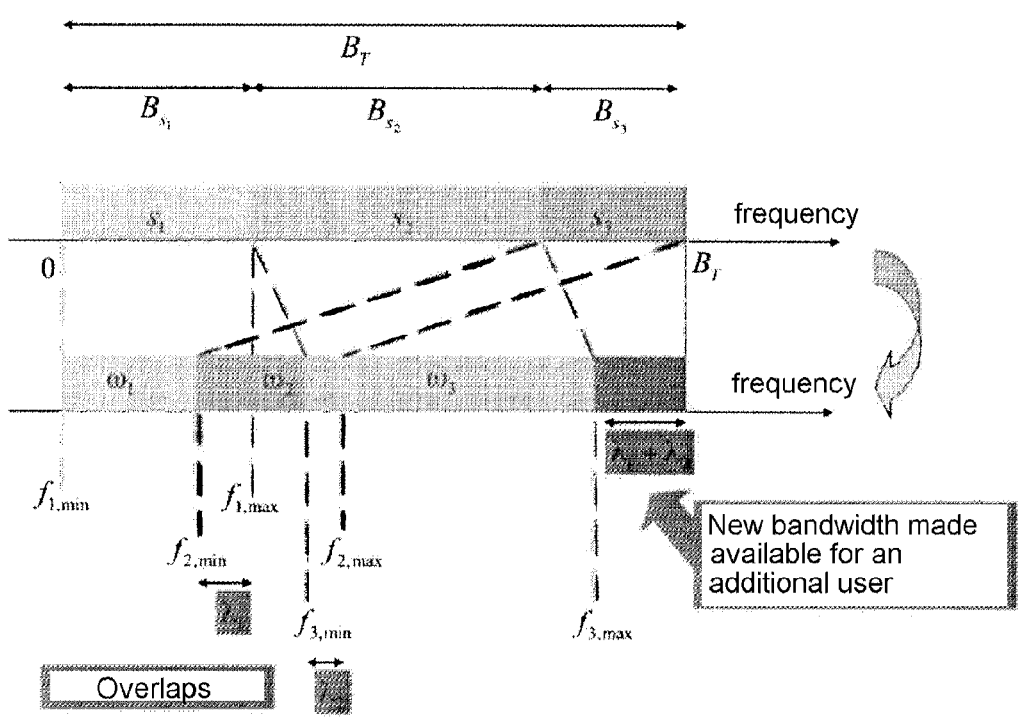
FIG. 3 shows an implementation of a method of the invention for redistributing frequency subbands.

An example of performing this step 3 is shown in FIG. 3. It is assumed in this example that initially three antennas (P=3) share a bandwidth $B_T$ using respective subbands $B_{s_1}$, $B_{s_2}$ and $B_{s_3}$. After step 4:

the antenna previously referenced $s_1$ is now referenced $\omega_1$ and has allocated thereto a subband $B_{\omega_1}$ lying in the range $f_{1,min}$ to $f_{1,max}$;

the antenna previously referenced $s_2$ is now referenced $\omega_3$ and has allocated thereto a subband $B_{\omega_3}$ lying in the range $f_{3,min}$ to $f_{3,max}$; and the antenna previously referenced $s_3$ is now referenced $\omega_2$ and has allocated thereto a subband $B_{\omega_2}$ lying in the range $f_{2,min}$ to $f_{2,max}$.

Let $\Lambda$ be the list of overlaps associated with the interfaces of the sequence $\Omega$ The multiple overlaps serve to release an additional subband of size:

$$B_{\omega_{P+1}} = \sum_{v=1}^{P} \lambda_v$$

This band may advantageously be allocated to an antenna that did not form part of the list S or of the list Ω, and that was previously unable to communicate with the base station as desired because the bandwidth $B_T$ was fully occupied. In a variant, it is possible to share this additional subband over a plurality of additional antennas, and then optionally reiterate the procedure of the invention for distributing subbands in order to maximize spectrum efficiency.

For example, in FIG. 3, the fact that $f_{2,min} < f_{1,max}$ corresponds to an overlap $\lambda_1$, and the fact that $f_{3,min} < f_{2,max}$ corresponds to an overlap $\lambda_2$. A new subband $B_{\omega_4}$ of width $(\lambda_1 + \lambda_2)$ is thus made available in the range $f_{3,max}$ to $B_T$, which new subband may be allocated to a fourth antenna.

Step 4: Signaling

The base station signals to each antenna device the frequency subband that is respectively allocated thereto. This signaling may include information about the overlaps (presence or absence, frequency position).

It should be observed that the present invention is equally applicable to downlink transmissions and to uplink transmissions.

For downlink transmissions, the base station also transmits all of the information needed by the receivers to enable them to demodulate the data signal, as described above, which signal is then sent to them by the base station. The information about overlaps may be particularly useful in this respect.

For uplink transmissions, consideration is given to a base station having at least P receive antennas for P users each having one transmit antenna. The base station associates each user with a respective receive antenna. Thereafter, the base station performs the above-described algorithm. Finally, it sends information to each transmission antenna device, which information includes in particular the frequency subband and the power that have been allocated respectively thereto. The transmit antennas can then transmit data to the base station in compliance with that information.

Finally, it may be observed that the information may be performed within nodes of a radio communications network (and in particular within base stations) by means of software and/or hardware components.

The software components may be incorporated in a conventional computer program for managing a network node. That is why the present invention also relates to a computer system, as mentioned above. The computer system comprises in conventional manner a central processor unit that uses signals to control a memory, together with an input unit and an output unit. The computer system may also be used for executing a computer program including instructions for performing the multiantenna radio communications method of the invention.

The invention also provides a computer program that is downloadable from a communications network and that includes instructions for executing steps of a multiantenna radio communications method of the invention when it is executed on a computer. The computer program may be stored on a computer readable medium, and it may be suitable for execution by a microprocessor.

The program may use any programming language and may be presented in the form of source code, object code, or code intermediate between source code and object code, in partially compiled form or in any other desirable form.

The invention also provides a computer readable data medium that includes instructions of a computer program as mentioned above.

The data medium may be any entity or device that is capable of storing the program. For example, the medium may comprise storage means such as a read only memory (ROM), e.g. a compact disk (CD) ROM or a microelectronic circuit ROM, or it may comprise magnetic recording means, e.g. a hard disk, or a universal serial bus (USB) flash drive, for example.

Furthermore, the data medium may be a transmissible medium such as an electrical or optical signal suitable for being conveyed via an electrical or optical cable, by radio, or by other means. The computer program of the invention may in particular be downloaded from a network of the Internet type.

In a variant, the data medium may be an integrated circuit in which the program is incorporated, the circuit being adapted to execute or to be used in the execution of the multiantenna radio communications method of the invention.

APPENDIX 1

---

Initialization:
i = 1;
v = 1.
Consider $s_i$.
$\omega_i = s_i$
$\Omega = \omega_i$
$f_1 = (f_{1,min}, f_{1,max})$ $f_{1,min} = -\dfrac{B_T}{2}$ $f_{1,max} = f_{1,min} + B_i$
F = [$f_1$]
Φ = $\rho_i$
Loop:
   While v < P do
   {
   $s_j = \arg\{\max(\delta B_{s_i, s_j}), s_j \notin \Omega\}$
   $\omega_{v+1} = s_j$
   $\Omega = [\omega_1, \ldots, \omega_v, \omega_{v+1}]$
   $\lambda_v = \delta B_{\omega_v, \omega_{v+1}}$
   $\Lambda = [\lambda_1, \ldots, \lambda_v, \lambda_{v+1}]$
   $f_{v+1,min} = f_{v,max} - \lambda_v$
   $f_{v+1,max} = f_{v+1,min} + B_{\omega_{v+1}}$
   $f_{v+1} = (f_{v+1,min}, f_{v+1,max})$
   $F = [f_1, \ldots, f_v, f_{v+1}]$
   $\phi_{v+1} = \rho'_j$
   $\Omega = [\phi_1, \ldots, \phi_v, \phi_{v+1}]$
   v = v + 1
   i = j
   }

---

The invention claimed is:

1. A multiantenna radio communications method wherein frequency subbands $B_{s_k}$, for k=1, ..., P, are allocated respectively to P user antennas $s_1, \ldots, s_P$ belonging to one or more users, from within a total frequency bandwidth $B_T$, and wherein at least one of the user antennas communicates with a base station over its respective frequency subband $B_{s_k}$ by a signal that has been filtered by time reversal, wherein for at least one pair of user antennas $s_i$ and $s_j$, where i,j=1, ..., P and i≠j, the respective frequency subbands $B_{s_i}$ and $B_{s_j}$ overlap by a target overlap amount $\delta B_{s_i, s_j}$, the target overlap amount $\delta B_{s_i, s_j}$ being a function of and based at least in part on the correlation between the respective propagation channels of these two user antennas with the base station, the base station being physically separate from the P user antennas.

2. The multiantenna radio communications method according to claim 1, wherein the correlation between the propagation channels of two user antennas $s_i$ and $s_j$ is evaluated from auto-correlation and cross-correlation functions between the impulse responses $h_i(t)$ and $h_j(t)$ of the two channels.

3. A multiantenna radio communications method wherein frequency subbands $B_{s_k}$, for k=1, ..., P, are allocated respectively to P user antennas $s_1$, ..., $s_P$ belonging to one or more users, from within a total frequency bandwidth $B_T$, and wherein at least one of the user antennas communicates with a base station over its respective frequency subband $B_{s_k}$ by a signal that has been filtered by time reversal, wherein for at least one pair of user antennas $s_i$ and $s_j$, where i,j=1, ..., P and i≠j, the respective frequency subbands $B_{s_i}$ and $B_{s_j}$ overlap by $\delta B_{s_i,s_j}$, the overlap $\delta B_{s_i,s_j}$ being a function of the correlation between the respective propagation channels of these two user antennas with the base station;

for each pair of user antennas $s_i$ and $s_j$, where i,j=1, ..., P and i≠j, calculating a target overlap $\delta B_{s_i,s_j}$;

redistributing P frequency subbands to the P user channels, now referenced $\omega_1$, ..., $\omega_P$, in such a manner that the subbands of each pair of successive subbands $B_{\omega_l}$ and $B_{\omega_{l+1}}$ overlap by $\delta B_{s_i,s_j}$, where the antenna $\omega_{P+1}$, was previously referenced $s_i$ and the antenna $\omega_{l+1}$ was previously referenced $s_j$;

allocating to the new user antenna, referenced $\omega_{P+1}$, a frequency subband $B_{\omega_{P+1}}$ from the bandwidth $B_T$, which subband is of width equal to at least a portion of the sum of the overlaps $\delta B_{s_i,s_j}$; and signaling to each of the (P+1) user antennas of the new frequency subband $B_{\omega_k}$, where k=1, ..., P+1, that has been respectively allocated thereto.

4. A multiantenna radio communications device configured to communicate with P user antennas $S_1$, ..., $s_P$ belonging to one or more users and having frequency subbands $B_{s_k}$, where k=1, ..., P, respectively allocated thereto from within a total frequency bandwidth $B_T$, and configured to communicate with at least one of the user antennas over its respective frequency subband $B_{s_k}$ by a signal that has been filtered by time reversal, the multiantenna radio communications device further configured to allocate respective frequency subbands $B_{s_i}$ and $B_{s_j}$ to at least one pair of user antennas $s_i$ and $s_j$, where i,j=1, ..., P and i≠j, the respective frequency subbands $B_{s_i}$ and $B_{s_j}$ overlapping by a target overlap amount $\delta B_{s_i,s_j}$, and the target overlap amount $\delta B_{s_i,s_j}$ being a function of and based at least in part on the correlation between the respective propagation channels of the two user antennas with the device, the device being physically separate from the P user antennas.

5. The multiantenna radio communications device according to claim 4, wherein the multiantenna radio communications device is configured to evaluate the correlation between the propagation channels of the two user antennas $s_i$ and $s_j$ from auto-correlation and cross-correlation functions between the impulse responses $h_i(t)$ and $h_j(t)$ of the two channels.

6. A base station, the base station including the multiantenna radio communications device according to claim 4.

7. A non-transitory computer-readable medium including computer program code instructions that, when executed by a computer, are programmed to execute the method according to claim 1.

* * * * *